United States Patent [19]
Gedl

[11] Patent Number: 5,887,112
[45] Date of Patent: Mar. 23, 1999

[54] COMBINATION APPARATUS COMPRISING A VIDEO-RECORDER SECTION AND A TELEVISION-RECEIVER SECTION

[75] Inventor: Karl Gedl, St. Pölten-Spratzern, Austria

[73] Assignee: U.S. Philips Corporation, New York, N.Y.

[21] Appl. No.: 757,525

[22] Filed: Nov. 27, 1996

[30] Foreign Application Priority Data

Dec. 5, 1995 [EP] European Pat. Off. .............. 95203344

[51] Int. Cl.⁶ .............................. H04N 5/91; H04N 7/00
[52] U.S. Cl. ................................. 386/71; 386/46
[58] Field of Search .................................. 386/71, 46, 67, 386/84, 6, 12; 348/787, 789, 836, 838, 843; H04N 5/91, 7/00

[56] References Cited

U.S. PATENT DOCUMENTS

| | | | |
|---|---|---|---|
| 5,094,513 | 3/1992 | Fukuda | 312/7.2 |
| 5,291,343 | 3/1994 | Goto | 360/33.1 |
| 5,499,115 | 3/1996 | Kojima et al. | 348/836 |

*Primary Examiner*—Robert Chevalier
*Attorney, Agent, or Firm*—Edward W. Goodman

[57] ABSTRACT

In a combination apparatus comprising a video-recorder section and a television-receiver section in a common housing and in which the video-recorder section comprises a pulse generation device for the generation of artificial V-pulses in a multi-speed reproduction mode and the television-receiver section comprises a vertical deflection signal generation device, an electrical connection has been provided between the pulse generation device and the vertical deflection signal generation device for directly applying the artificial V-pulses to the vertical deflection signal generation device.

3 Claims, 2 Drawing Sheets

COMBINATION APPARATUS COMPRISING A VIDEO-RECORDER SECTION AND A TELEVISION-RECEIVER SECTION

BACKGROUND OF THE INVENTION

The invention relates to a combination apparatus which comprises a video-recorder section and a television-receiver section in a common housing, the video-recorder section comprising at least one rotationally drivable recording and reproducing video signals on/from a magnetic tape which is drivable in its longitudinal direction in adjacent tracks which are inclined relative to the longitudinal direction of the magnetic tape, and the video-recorder section being adapted to reproduce recorded video signals with at least one reproduction tape speed which differs from a recording tape speed, and the video-recorder section comprising a pulse generation device which generates artificial vertical synchronization pulses during reproduction of recorded video signals with a reproduction tape speed which differs from the recording tape speed, and the television-receiver section comprising a picture display device, for displaying video signals reproduced by means of the video-recorder section, and a vertical deflection signal generation device, which generates vertical deflection signals for controlling the vertical deflection in the picture display device and which during the display of video signals reproduced with a reproduction tape speed which differs from the recording tape speed is triggered by artificial vertical synchronization pulses then applied.

Such a combination apparatus of the type defined in the opening paragraph manufactured by the Applicant has, for example, been marketed under the type designation 14TVCR240. In this known combination apparatus the electrical construction of both the video-recorder section and the television-receiver section is as is known per se from apparatuses mounted in separate housings, i.e. from a separate video recorder and from a separate television receiver. In accordance with this construction which is known per se from separate apparatuses the artificial vertical synchronization pulse generated by the pulse generation device of the known combination apparatus and briefly referred to hereinafter as the V-pulse is also applied to an insertion device, by means of which the artificial V-pulses are inserted into the video signals reproduced in a mode referred to as multi-speed reproduction with a reproduction tape speed which differs from the recording tape speed. The composite signal obtained by insertion of the artificial V-pulses into the video signals reproduced in a multi-speed reproduction mode is transferred from the video-recorder section to the television-receiver section, after which the artificial V-pulses are extracted from this composite signal in the television-receiver section and are applied to the vertical deflection signal generation device to trigger this generation device. It is to be noted that the insertion of the artificial V-pulses into the video signals reproduced in a multi-speed reproduction mode with a reproduction tape speed which differs from the recording tape speed is effected because during such a multi-speed reproduction mode the situation may arise that a reproduction error zone, which as is known occurs during such a multi-speed reproduction and which is reproduced as a "noise bar" by a picture display device, appears exactly in the time interval in which the reproduction of a recorded natural V-pulse occurs, in which case the natural V-pulse is not reproduced, as a result of which the vertical synchronization in the picture display device is then disturbed or drops out completely.

In the known combination apparatus a correct vertical synchronization in the picture display device of the television-receiver section and, as a consequence, a steady picture reproduction are not always guaranteed in all the possible multi-speed reproduction modes in spite of the insertion of the artificial V-pulses into the video signals reproduced in a multi-speed reproduction mode with a reproduction tape speed which differs from the recording tape speed. This is because the situation may occur that a reproduction error zone in a reproduced video signal, which zone causes a "noise bar", is situated for example briefly before an artificial V-pulse inserted into the reproduced video signal and that the signal occurring during such a reproduction error zone contains signal components which fake a V-pulse, which signal components are then erroneously recognized as artificial V-pulses in the vertical deflection signal generation device and give rise to a disturbed vertical synchronization in the picture display device and, consequently, in vertical jumping of the displayed picture. Since in the video-recorder section the artificial V-pulses are inserted into the video signals reproduced in a multi-speed reproduction mode and in the television-receiver section they should subsequently be extracted from the composite signal obtained after insertion, false information about the presence of a V-pulse may be derived from the composite signal in the extraction device, which gives rise to an adverse effect in the television-receiver section.

SUMMARY OF THE INVENTION

It is an object of the invention to preclude the problems outlined above and to provide an improved combination apparatus of the type defined in the opening paragraph, which guarantees a correct vertical synchronization in the picture display device of the television-receiver section in all the multi-speed reproduction modes. In a combination apparatus of the type defined in the opening paragraph this object is achieved in that an electrical connection has been provided between the pulse generation device of the video-recorder section and the vertical synchronization signal generation device of the television-receiver section, which connection can be brought into an electrically conductive state at least during reproduction of video signals with a reproduction tape speed which differs from the recording tape speed and via which the artificial vertical synchronization pulses generated by the pulse generation device can be applied directly to the vertical deflection signal generation device. Thus, it is achieved in a particularly simple manner and with minimal expenditure that the artificial V-pulses generated in the video-recorder section are applied directly to the vertical deflection signal generation device in the television-receiver section without having to be combined with the video signals reproduced in a multi-speed reproduction mode with a reproduction tape speed which differs from the recording tape speed, so that it is not necessary to extract the V-pulses from a composite signal and faking of artificial V-pulses by signal components occurring in a composite signal is not possible. The direct application of the artificial V-pulses generated by the pulse generation device in the video-recorder section to the vertical deflection signal generation device in the television-receiver section always guarantees a correct vertical synchronization in the picture display device and always ensures a stable and correct picture reproduction on the display screen of the picture display device in all multi-speed reproduction modes.

An advantageous embodiment of a combination apparatus in accordance with the invention is characterized in that a switching device has been included in the electrical connection between the pulse generation device and the vertical deflection signal generation device, by means of which switching device the electrical connection can be brought into its non-conductive state during reproduction of video signals with a reproduction tape speed equal to the recording tape speed. In this way it is achieved that during the reproduction of recorded video signals with the reproduction tape speed equal to the recording tape speed, i.e. in a normal reproduction mode, in which normally no reproduction error zones occur and consequently always a correct reproduction of the recorded natural V-pulses is guaranteed, no artificial V-pulses are applied to the vertical deflection signal generation device in the television-receiver section.

In an advantageous embodiment of a combination apparatus as defined hereinbefore, comprising a separator device for extracting the vertical synchronization pulses from the reproduced video signals and for supplying the extracted vertical synchronization pulses to an output of said separator device, the output of the separator device is coupled to the switching device and the vertical synchronization pulses extracted by means of the separator device can be applied to the vertical deflection signal generation device via the switching device during reproduction of video signals with a reproduction tape speed equal to the recording tape speed, when the electrical connection between the pulse generation device and the vertical deflection signal generation device has been brought into its non-conductive state by means of the switching device.

The above-mentioned as well as further aspects of the invention will become apparent from the exemplary embodiment described hereinafter and will be elucidated by means of this exemplary embodiment.

BRIEF DESCRIPTION OF THE DRAWINGS

The invention will be described in more detail hereinafter with reference to the drawings, which show an embodiment given by way of example but to which the invention is not limited.

DETAILED DESCRIPTION OF THE PREFFERRED EMBODIMENTS

Figure 1:
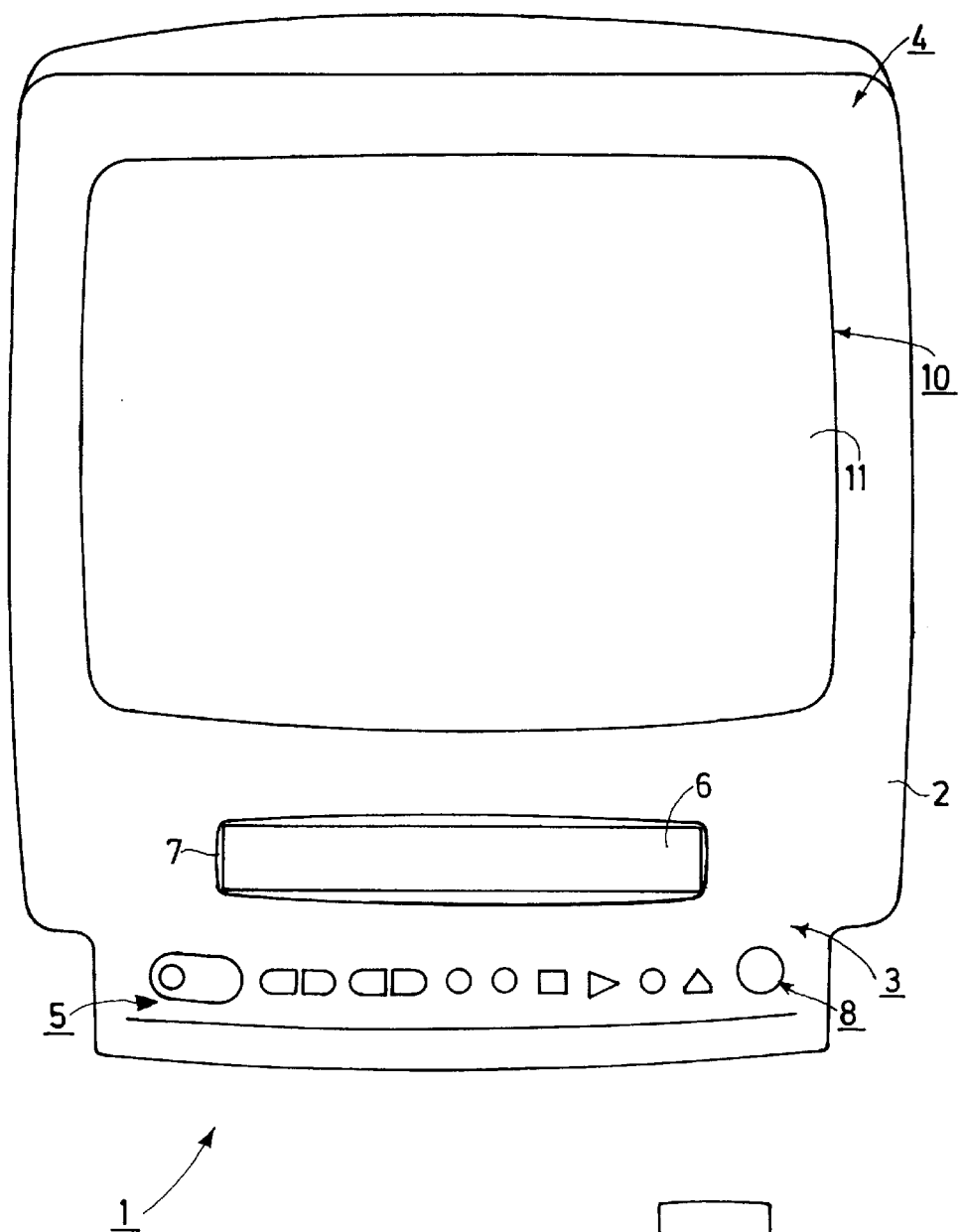
FIG. 1 shows an oblique front view of a combination apparatus comprising a video-recorder section and a television-receiver section, and a plan view of a remote control device for the combination apparatus.
Figure 1:
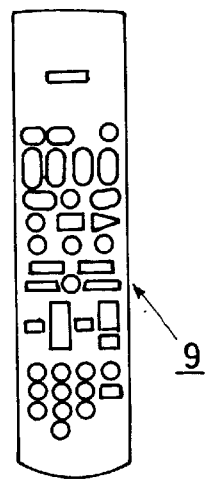

FIG. 1 shows a combination apparatus 1 comprising a video-recorder section 3 and a television-receiver section 4 in a common housing 2. Hereinafter, the combination apparatus 1 will be referred to briefly as the apparatus 1.

Of the video-recorder section 3 FIG. 1 shows a set of keys 5 and a loading aperture 7 closed by means of a pivotable shutter 6. A known magnetic-tape cassette, not shown in FIG. 1, can be loaded into and removed from the video-recorder section 3 of the apparatus 1 through the loading aperture 7, the shutter 6 then being pivoted aside. One of the keys of the set 5 serves for switching on the apparatus 1 and the other keys serve for the selection of programs, for volume control and for starting various modes of operation of the apparatus 1. It is to be noted that the apparatus 1 comprises a remote control receiver 8, shown diagrammatically 8 in FIG. 1 and adapted to receive remote control signals from a remote control device 9. In known manner the remote control device 9 enables remote control of modes of operation and functions of the apparatus 1, for example a recording mode, a normal reproduction mode and multi-speed reproduction modes, in which a magnetic tape, which is drivable in its longitudinal direction and which is accommodated in a magnetic-tape cassette loaded into the apparatus 1, can be driven with a plurality of reproduction tape speeds which differ from a recording tape speed.

FIG. 1 shows a part of a picture display device 10 of the television-receiver section 4, i.e. the display screen 11 of a cathode ray tube forming the picture display device 10.

Figure 2:
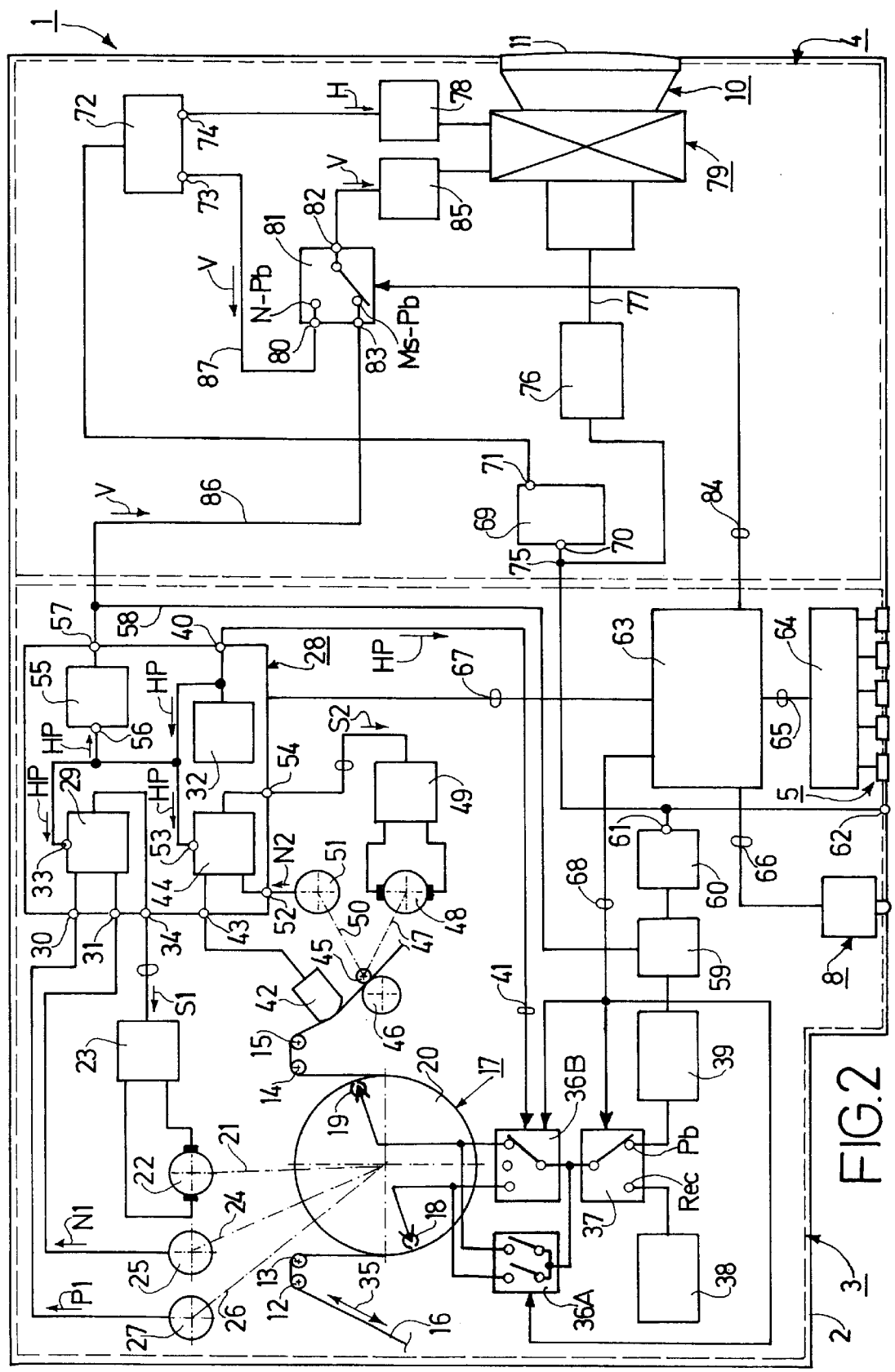
FIG. 2 shows diagrammatically those parts of the combination apparatus of FIG. 1 which are relevant in the present context.

The apparatus 1 of FIG. 1 is shown diagrammatically in FIG. 2. Of the elements mentioned in the above description of the apparatus 1 with reference to FIG. 1 the housing 2, the video-recorder section 3, the television-receiver section 4, the set of keys 5, the remote control receiver 8 and the picture display device 10 and its display screen 11 are shown diagrammatically in FIG. 2.

As already stated, a magnetic-tape cassette, neither shown in FIG. 2, can be loaded into the video-recorder section 3. After such an insertion of a magnetic-tape cassette into the video-recorder section 3 this cassette occupies an operating position, in which a magnetic tape 16 accommodated in the magnetic-tape cassette can be extracted from the magnetic-tape cassette and wrapped around a drum-shaped scanning device 17 of the video-recorder section 3 by means of movable tape guides 12, 13 and 14, 15 of a tape threading device. The drum-shaped scanning device 17 comprises a given number of rotationally drivable magnetic heads, in the present case two magnetic heads 18 and 19. The magnetic heads 18 and 19 are mounted on a rotationally drivable drum section 20 of the drum-shaped scanning device 17.

The rotationally drivable drum section 20 can be driven by means of a speed-controlled first motor 22 via a drive connection 21 shown diagrammatically as a dash-dot line. The first motor 22 is powered by means of a first power supply circuit 23. A first tacho-generation device 25 is coupled to the rotationally drivable drum section 20, as indicated diagrammatically by means of a dash-dot line 24, and supplies a first tacho-signal N1 which is proportional to the instantaneous actual speed of the rotationally drivable drum section 20. Moreover, a position-pulse generation device 27, is coupled to the rotationally drivable drum section 20, as indicated by a dash-dot line 24, to supply one position pulse P1 per revolution of the rotationally drivable drum section 20.

The video recorder section 3 includes a first microcomputer 28 adapted to realize a plurality of devices and to perform a plurality of functions, of which only those ones will be described which are relevant in the present context.

The first microcomputer 28 is adapted, inter alia, to form a first speed control device 29. The first speed control device 29 receives the position pulses P1 via an input 30 of the first microcomputer 28 and the first tacho-signal N1 via a further input 31.

The first microcomputer 28 further constitutes a first pulse generation device 32, by means of which a so-termed head-switching pulse train HP can be generated. The first pulse generation device 32 is triggered by the internal clock of the microcomputer 28 and generates as the head-switching pulse train HP a rectangular pulse train having alternate rising and falling edges, the time interval between successive edges in the normal reproduction mode being exactly 20 ms and being switched to a value slightly below 20 ms in forward multi-speed reproduction modes and to a value slightly above 20 ms in reverse multi-speed reproduction modes. The first pulse generation device 32 is thus switchable with respect to the time intervals between successive pulse edges, switching being effected in dependence upon the selected multi-speed reproduction mode, as known since long from video recorders marketed by the Applicant. The head-switching pulse train HP generated by means of the first pulse generation device 32 is applied to an input 33 of the first speed control device 29.

The first speed control device 29 is constructed in such a manner that in a speed control process it controls the actual speed of the rotationally drivable drum section 20, which speed is represented by the first tacho-signal N1, so to be equal to a given nominal speed and, in addition, in a phase control process it controls the phase of the position pulses P1 so as to be in a given nominal phase relationship with respect to the edges of the head-switching pulse train HP. This control is achieved in that the first speed control device 29 supplies appropriate control information S1 to the first power-supply circuit 23 for the first motor 22 via an output 34 of the first microcomputer 28.

The magnetic heads 18 and 19 serve for recording and reproducing video signals on/from the magnetic tape 16, which can be driven in its longitudinal direction 35 indicated by a double arrow, which tape has been wrapped around the drum-shaped scanning device 17 along a helical path over an angle of slightly more than 180°, so that the magnetic heads 18 and 19 scan adjacent tracks which are inclined relative to the longitudinal direction 35 of the magnetic tape 16. One of the two magnetic heads 18 and 19 is always in scanning contact with the magnetic tape 16. During the recording of video signals both magnetic heads 18 and 19 are connected to a recording/reproduction switching device 37 via a head activation device 36A, which can be activated from an off-state and set from this off-state to an on-state, via which switching device 37 the video signals to be recorded are supplied from a recording signal processing device 38 to the head activation device 36A when the apparatus 1 is in the recording mode "Rec", which activation device drives both magnetic heads 18 and 19 at the same time. During the reproduction of video signals the magnetic head 18 or 19 which is in scanning contact with the magnetic tape 16 is connected to the recording/reproduction switching device 37 via a head switching device 36B, via which device 37 the reproduced video signals supplied by the head switching device 36 are applied to a reproduction signal processing device 39 when the apparatus 1 has been set to any one of the reproduction modes "Pb". The head switching device 36B can be activated from an off-state and can be set from this off-state to two on-states. The change-over of the head switching device 36B between its two on-states is controlled by the head-switching pulse train HP generated by the first pulse generation device 32, which for this purpose is supplied to an output 40 of the first microcomputer 28 and is applied to the head switching device 36B via a line 41.

A so-termed CTL magnetic head 42 is in scanning contact with the magnetic tape 16. When the apparatus 1 is in the recording mode CTL pulses, which have been generated in dependence on the natural V-pulses contained in the video signal to be recorded, are recorded in a longitudinal track on the magnetic tape 16 by means of the CTL magnetic head 42. When the apparatus 1 is in one of the reproduction modes the CTL pulses are reproduced by means of the CTL magnetic head 42 and are applied to a second speed control device 44 via an input 43 of the first microcomputer 28, which device 44 is formed by means of the first microcomputer 28.

The second speed control device 44 serves for the speed control of a capstan 45 against which the magnetic tape 16 is pressed by means of a movable pressure roller 46 in the recording mode and in one the reproduction modes of the apparatus 1 and by means of which the magnetic tape is drivable with a given recording tape speed in the recording mode of the apparatus 1 and with given reproduction tape speeds in the reproduction modes of the apparatus 1, one of said reproduction tape speeds corresponding to the recording tape speed and the other reproduction speeds differing from and being a given ratio to the recording tape speed. The capstan 45 can be driven by means of a speed-controlled second motor 48 via a drive transmission 47 shown diagrammatically as a dash-dot line in FIG. 2. A second power supply device 49 has been provided to power the second motor 48. As indicated by a dash-dot line 50 in FIG. 2, the capstan 45 is coupled to a second tacho-generation device 51, which supplies a second tacho-signal N2 which is proportional to the actual speed of the capstan 45 and which is applied to the second speed control device 44 via an input 52 of the first microcomputer 28. Furthermore, the head-switching pulse train HP is applied to an input 53 of the second speed control device 44.

The second speed control device 44 is constructed in such a manner that in a speed control process it controls the actual speed of the capstan 45, which speed is represented by the second tacho-signal N2, so as to be equal to a given nominal speed and, in addition, in a phase control process it controls the phase of the CTL pulses so as to be in a given nominal phase relationship with respect to the edges of the head-switching pulse train HP. This control is achieved in that the second speed control device 44 supplies appropriate control information S2 to the second power-supply device 49 for the second motor 48 via an output 54 of the first microcomputer 28.

The first microcomputer 28 further forms a second pulse generation device 55, having an input 56 to which the head-switching pulse train HP is applied. The second pulse generation device 55 is constructed to generate artificial V-pulses, namely in such a manner that an artificial V-pulse having a duration of approximately 192 μs, corresponding to three times the line period of 64 μs, is generated at a given time interval of approximately 200 μs after each edge of the head-switching pulse train HP. The second pulse generation device 55 supplies the artificial V-pulses to an output 57 of the first microcomputer 28. The artificial V-pulses are generated only when the apparatus 1 is in a multi-speed reproduction mode.

The artificial V-pulses are applied from the output 57 of the first microcomputer 28 to an insertion stage 59 via a line 58, which insertion stage inserts the artificial V-pulses into the reproduced video signals scanned from the magnetic tape 16 by means of the magnetic heads 18 and 19. The composite signal obtained by insertion of the artificial V-pulses into the reproduced video signals in a multi-speed reproduction mode is applied to an amplifier and buffer stage 60, from whose output 61 this composite signal is supplied to an output 62 of the apparatus 1, in order to be applied to, for example, an external television receiver.

With respect to the video-recorder section 3 it is to be noted that the video-recorder section 3 comprises a second microcomputer 63, which mainly serves to carry out control functions. The set of keys 5 is connected to an interface device 64, by means of which control information generated in the interface device 64 and corresponding to a key actuation can be applied to the second microcomputer 63 via a diagrammatically shown connection 65. Moreover, control information generated by the remote control receiver 8 can be applied to the second microcomputer 63 via a diagrammatically shown connection 66. The second microcomputer 63 supply control information corresponding to the applied control information to the first microcomputer 28 via a diagrammatically shown connection 67. Moreover, the second microcomputer 63 can supply control information, via a diagrammatically shown further connection 68, to the recording/reproduction switching device 37 in order to change over this device and to the head activation device 36A and to the head switching device 36B in order to actuate these devices. By means of the second microcomputer 63 it is possible to generate inter alia control information with which the various modes of operation of the apparatus 1 can be started, such as the recording mode, the normal reproduction mode, all the multi-speed reproduction modes, the fast forward mode, the fast reverse mode etc. It is to be noted that instead of the first microcomputer 28 and the second microcomputer 63, i.e. instead of two microcomputers, only one single microcomputer may be provided.

Furthermore, it is to be noted that in the normal reproduction mode of the apparatus 1 the video signals then reproduced by the magnetic heads 18 and 19 are also applied to the reproduction signal processing device 39 via the head switching device 36B and the recording/reproduction switching device 37, but in this case no artificial V-pulses are inserted into the video signals supplied by the reproduction signal processing device 39 because the second pulse generation device 55 generates these pulses only in the multi-speed reproduction modes.

The television-receiver section 4 comprises a synchronization signal separator device 69 having an input 70 connected to the output 61 of the amplifier and buffer stage 60 of the video-recorder section 3. On an output 71 the synchronization signal separator device 69 supplies the synchronization signals separated from the applied video signals, i.e. vertical synchronization signals (V-pulses) and horizontal synchronization signals (H-pulses). The extracted V-pulses and H-pulses are applied to a pulse processing device 72 which in the normal reproduction mode of the apparatus 1 supplies the natural V-pulses extracted from the video signals on a first output 73 and in the multi-speed reproduction modes of the apparatus 1 supplies the artificial V-pulses inserted into and subsequently extracted from the reproduced video signals, but these pulses are not used any further. In all the reproduction modes of the apparatus 1 the H-pulses extracted from the reproduced video signals appear on a second output 74 of the pulse processing device 72.

In all the reproduction modes of the apparatus 1 the reproduced video signals including the synchronization signals are available on a node 75 preceding the input 70 of the synchronization signal separator device 69 and are applied to a video signal processing device 76, in which the synchronization signals are suppressed, after which the reproduced video signals are processed in such a manner that the processed and reproduced video signals can be applied to the picture display device 10 via a diagrammatically shown connection 77 in order to display the pictures corresponding to the reproduced video signals on the display screen 11.

The H-pulses appearing on the second output 74 of the pulse processing device 72 are applied directly to a horizontal deflection signal generation device 78 to trigger this horizontal deflection signal generation device 78. The horizontal deflection signal generation device 78 generates horizontal deflection signals, which are applied to a diagrammatically shown deflection coil arrangement 79 of the picture display device 10 in order to control the horizontal deflection of an electron beam.

The V-pulses appearing on the first output 73 of the pulse processing device 72 are applied to a first input 80 of a switching device 81 which in the normal reproduction mode of the apparatus 1 connects the first input 80 to an output 82 of this device and which in the multi-speed reproduction modes of the apparatus 1 connects a second input 83 to the output 82 of the switching device 81. The switch position of the switching device 81 is controlled by the second microcomputer 63, which for this purpose supplies appropriate control information to the switching device 81 via a diagrammatically shown connection 84. In the normal reproduction mode of the apparatus 1 the natural V-pulses applied to the first input 80 via the switching device 81 are supplied to a vertical deflection signal generation device 85 in order to trigger this generation device. The vertical deflection signal generation device 85 serves for the generation of vertical deflection signals, which are applied to the deflection coil arrangement 79 of the picture display device 10 for the vertical deflection of an electron beam.

Advantageously, an electrical connection 86 has been provided between the second pulse generation device 55 of the video-recorder section 3 and the vertical deflection signal generation device 85 of the television-receiver section 4 in the apparatus 1, which connection 86 can be brought into its electrically conductive state during the reproduction of recorded video signals with a reproduction tape speed which differs from the recording tape speed in a multi-speed reproduction mode and via which connection the artificial V-pulses generated by the pulse generation device 55 can be applied directly to the vertical deflection signal generation device 85. The electrical connection 86 is then coupled from the output 57 of the first microcomputer 28 to the vertical deflection signal generation device 85 via the second input 83 and the output 82 of the switching device 81, so that in any one of the multi-speed reproduction modes of the apparatus 1 the artificial V-pulses are applied directly to the vertical deflection signal generation device 85, so that the vertical deflection in the picture display device 10 is controlled directly by the video-recorder section 3. This ensures in a very simple manner that the appearance of spurious signals on the input of the vertical deflection signal generation device 85, which can be interpreted erroneously as artificial V-pulses, is excluded and thereby guarantees a correct vertical synchronization in the picture display device 10 in all the multi-speed reproduction modes and, consequently, a stable picture reproduction by means of the picture display device 10. As is apparent from FIG. 2, the switching device 81 has been included in the electrical connection 86 between the second pulse generation device 55 and the vertical deflection signal generation device 85 and enables the electrical connection 86 to be brought into a conductive state during the reproduction of recorded video signals with a reproduction tape speed which differs from the recording tape speed in a multi-speed reproduction mode, so that advantageously the artificial V-pulses generated by the second pulse generation device 55 can be applied directly to the vertical deflection signal generation device 85 in order to trigger the latter, and which further enables the electrical connection 86 to be brought into a non-conductive state during the reproduction of recorded video signals with a reproduction tape speed equal to the recording tape speed in the normal reproduction mode, so that advantageously no artificial V-pulses are applied to the vertical deflection signal generation device 85. In the normal reproduction mode the switching device 81 brings another electrical connection 87 into its conductive state, which connection couples the output 73 of the pulse processor 72 to the vertical deflection signal generation device 85 via the first input 80 and the output 82 of the switching device 81, so that in this case the natural V-pulses extracted from the reproduced video signals by means of the synchronization signal separator device 69 are applied to the vertical deflection signal generation device 85, thereby also assuring a correct vertical synchronization.

The invention is not limited to the exemplary embodiment described hereinbefore. The measures in accordance with the invention can also be used in a combination apparatus whose video-recorder section comprises a drum-shaped scanning device having more than two rotationally drivable magnetic heads, and also in a combination apparatus comprising as display device a liquid-crystal display device (LCD). It is to be noted that if required, in addition, an amplifier stage, a pulse-shape stage, a buffer stage and the like may be arranged in the electrical connection between the pulse generation device and the vertical deflection signal generation device. It is to be noted also that the embodiment of a combination apparatus described by way of example with reference to FIGS. 1 and 2 obviously also effects an audio-signal recording and reproduction, but this has been ignored in the drawings and in the description because it is not relevant in the present context. Finally, it is to be noted that, in addition to a video-recorder section and a television-receiver section, a combination apparatus in accordance with the invention may in addition comprise further sections, for example a radio-receiver section, a Compact-Disc-player section, a video-disc-player section and the like.

What is claimed is:

1. A combination apparatus which comprises a video-recorder section and a television-receiver section in a common housing, the video-recorder section comprising at least one rotationally drivable recording and reproducing video signals on/from a magnetic tape which is drivable in its longitudinal direction in adjacent tracks which are inclined relative to the longitudinal direction of the magnetic tape, and the video-recorder section being adapted to reproduce recorded video signals with at least one reproduction tape speed which differs from a recording tape speed, and the video-recorder section comprising a pulse generation device which generates artificial vertical synchronization pulses during reproduction of recorded video signals with a reproduction tape speed which differs from the recording tape speed, and the television-receiver section comprising a picture display device, for displaying video signals reproduced by means of the video-recorder section, and a vertical deflection signal generation device, which generates vertical deflection signals for controlling the vertical deflection in the picture display device and which during the display of video signals reproduced with a reproduction tape speed which differs from the recording tape speed is triggered by artificial vertical synchronization pulses then applied, characterized in that an electrical connection has been provided between the pulse generation device of the video-recorder section and the vertical synchronization signal generation device of the television-receiver section, which connection can be brought into an electrically conductive state at least during reproduction of video signals with a reproduction tape speed which differs from the recording tape speed and via which the artificial vertical synchronization pulses generated by the pulse generation device can be applied directly to the vertical deflection signal generation device.

2. A combination apparatus as claimed in claim 1, characterized in that a switching device has been included in the electrical connection between the pulse generation device and the vertical deflection signal generation device, by means of which switching device the electrical connection can be brought into its non-conductive state during reproduction of video signals with a reproduction tape speed equal to the recording tape speed.

3. A combination apparatus as claimed in claim 2, comprising a separator device for extracting the vertical synchronization pulses from the reproduced video signals and for supplying the extracted vertical synchronization pulses to an output of said separator device, characterized in that the output of the separator device is coupled to the switching device and the vertical synchronization pulses extracted by means of the separator device can be applied to the vertical deflection signal generation device via the switching device during reproduction of video signals with a reproduction tape speed equal to the recording tape speed, when the electrical connection between the pulse generation device and the vertical deflection signal generation device has been brought into its non-conductive state by means of the switching device.

* * * * *